United States Patent [19]

Katzman

[11] 3,737,871

[45] June 5, 1973

[54] STACK REGISTER RENAMER

[75] Inventor: James A. Katzman, Cupertino, Calif.

[73] Assignee: Hewlett-Packard Company, Palo Alto, Calif.

[22] Filed: July 28, 1971

[21] Appl. No.: 166,867

[52] U.S. Cl. .......... 340/172.5

[51] Int. Cl. .......... G11c 19/00, G06f 9/06

[58] Field of Search .......... 340/172.5

[56] References Cited

UNITED STATES PATENTS

| | | | |
|---|---|---|---|
| 3,548,384 | 12/1970 | Barton et al. | 340/172.5 |
| 3,510,847 | 5/1970 | Carlson et al. | 340/172.5 |
| 3,601,809 | 8/1971 | Gray et al. | 340/172.5 |
| 3,546,677 | 12/1970 | Barton et al. | 340/172.5 |

*Primary Examiner*—Gareth D. Shaw
*Attorney*—A. C. Smith

[57] ABSTRACT

A stack oriented memory system for a computer is provided with a plurality of top of the stack registers. The top elements of a logical stack of information are stored in the stack registers and the remaining information is stored in core memory. An embodiment of a bookkeeping scheme for keeping track of the order of the information in the stack registers comprises two additional registers. A first register stores the number of stack registers filled with stack information. A second register stores a number representing a naming state which defines the logical order of the stack registers. There is also a third register for storing the location of the top piece of information in the stack in core memory. These three registers store the necessary information to keep track of the order of the information in and the size of the logical stack. These registers also facilitate the bookkeeping when information is added to or deleted from the stack registers.

10 Claims, 9 Drawing Figures

INVENTOR
JAMES A. KATZMAN

Patented June 5, 1973 3,737,871

4 Sheets-Sheet 2

INVENTOR
JAMES A. KATZMAN

INVENTOR
JAMES A. KATZMAN

INVENTOR
JAMES A. KATZMAN

STACK REGISTER RENAMER

BACKGROUND OF THE INVENTION

A computer using a stack memory system differs from the common non-stack type of computer in that information in a stack is usually implicitly rather than explicitly addressed. In a non-stack computer information is stored at specifically addressed locations in memory and is usually transferred to registers such as accumulators for manipulation. In a stack oriented computer the information is often manipulated right in the stack, eliminating the need for separate accumulators. In addition, the computer usually assumes that the information necessary for an operation is at the top of the stack, unless it is told otherwise. Therefore the programmer does not have to specify a memory address for stack operations, unless he is bringing information to the stack from some fixed address portion of memory, for example.

A memory stack is often a designated segment of core memory that has been set aside for stack operations. However, in order to provide for maximum operating speed, the information at the top of the stack is often contained in one or more registers. As the information lower in the stack is needed it is transferred to the top of the stack (TOS) registers, and as additional information is added to the stack, the lower information is transferred from the TOS registers to core memory. If the stack is quite large, other lower speed and lower cost memories such as discs may also be used.

Prior art computer memories have been built using the stack concept, including TOS registers. However, such prior art memories have generally been limited to two TOS registers due to the greatly increasing complexity of the bookkeeping logic as the number of TOS registers is increased. One example of a prior art computer using a stack memory with two TOS registers is described in Hauck & Dent, "Burroughs' B6500/B7500 Stack Mechanism", AFIPS Conference Proceedings, Vol. 32, p. 245, 1968.

A prior art method of bookkeeping for the TOS registers uses one naming register for each stack register to keep track of the order of the information in the stack registers. Each of these naming registers contains as many states (where two states equals one bit) as there are stack registers, thus the number of bits required for the bookkeeping function would grow at a rate greater than the number of stack registers (approximately N $\log_2$ N, where N is the number of stack registers). In addition, another register must be provided to keep track of which stack registers do not contain valid stack information. The information in a stack register is considered not valid if the register has been emptied, in a logical sense, as by removal of information from the top of the stack. This prior art system of bookkeeping becomes extremely cumbersome in terms of programming problems and logic hardware when more than two stack registers are used.

SUMMARY OF THE INVENTION

A preferred embodiment of the present invention uses four TOS registers. The TOS register names are assigned according to a unique, predetermined scheme, and each set of names in the scheme is identified as a state. The number of naming states is equal to the number of TOS registers, and is therefore equal to four in this embodiment. Thus only one two bit namer register is necessary to name four registers. In addition to the namer register, there is an SR register which stores the number of TOS registers containing valid stack information. The SR register in combination with the namer register tells which TOS registers contain valid stack information.

The namer scheme always maintains the same relative relationship between the registers, but changes which register is named the top one. TOS register name changes are made by raising or lowering the names of all the registers by the same increment, i.e. by stepping the namer register. Raising the highest register by one position actually makes that register last, since there are only as many positions or names as there are registers; thus, the renaming process is essentially a rotation of the register names. The number stored in the SR register tells how many of the top TOS registers contain valid stack information. For example, if SR = 3, the top three TOS registers contain valid information and the fourth or bottom register is logically empty.

The complexity of the hardware necessary to implement the present invention increases only as $\log_2$ N, rather than as N $\log_2$ N, as in the prior art. Such a reduction in complexity of course means a saving in hardware cost, and it contributes to programming simplicity. The complexity of the hardware needed to implement transfers of information to or from the TOS registers is also reduced by using the scheme of the present invention.

DESCRIPTION OF THE PREFERRED EMBODIMENT

Figure 1:
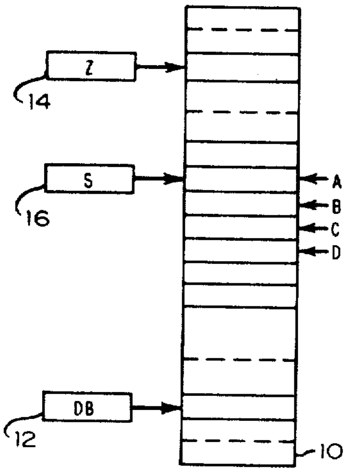
FIG. 1 is a schematic diagram of a logical stack.

FIG. 1 shows a schematic illustration of a logical stack of information in a computer memory 10. A DB register 12 stores the address of the lower limit of the stack and a Z register 14 stores the upper limit. An S register 16 stores the address of the top piece of information on the stack. For convenience, the top four levels of the stack will be referred to herein as A, B, C, and D, respectively. When information is added to the stack it goes into the address above S and after the information is stored, S is incremented by one address. Note that the address names A, B, C, and D also move up one. This operation is known as a PUSH. The complementary operation is called a POP, i.e. S is decremented by one, logically removing the top piece of information from the stack. While there may be information stored in memory 10 between S and Z, it is not valid stack information and is considered garbage. Thus a POP may remove information from the stack, even if the popped information is not transferred to any other location or register.

Figures 2, 5:
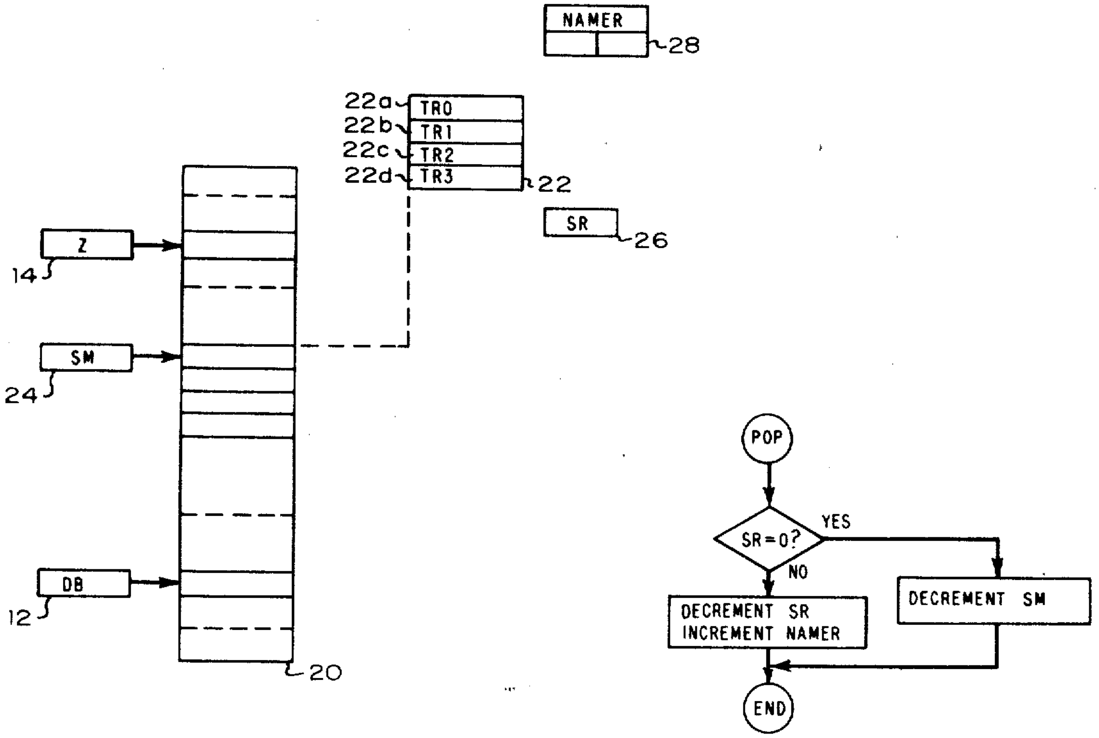
FIG. 2 is a schematic diagram of a stack memory having top of the stack registers.

A schematic illustration of a preferred embodiment of the present invention is shown in FIG. 2. Memory 10 is divided between a read-write memory 20 and top of stack (TOS) registers 22. Memory 20 may be a core, disc, drum or any other general purpose read-write computer memory. TOS registers 22 are usually general purpose accumulators. For the sake of this example, four TOS registers are shown and are designated TR0, TR1, TR2, and TR3, respectively. An SM register 24 stores the address of the top piece of stack information in memory 20. An SR register 26 stores the number of TOS registers 22 that contain valid stack information, and a NAMER register 28 stores a number representing the logical names of the TOS registers.

The number of bits required for a NAMER register in a machine having N TOS registers is $\log_2 N$ if N is an integral power of 2. In general, this number can be expressed as ceiling ($\log_2 N$) where the function ceiling ($x$) is defined as the smallest integer equal to or greater than $x$. Similarly, the number of bits required for an SR register is $\log_2 N + 1$ if N is an integral power of 2, or, in general, floor ($\log_2 N$) + 1 where floor ($x$) is defined as the largest integer equal to or less than $x$. Thus the complexity of the bookkeeping hardware is approximately proportional to $\log_2 N$ and therefore becomes less significant in terms of added cost as the number of TOS registers is increased.

As was previously mentioned, the top four pieces of information on the logical stack are denoted A, B, C, and D. However, these top four pieces of information will not necessarily all be in the TOS registers. For example, A and B might be in the TOS registers and C and D in memory 20. Thus, SM would point to C because C would be the top of the stack in memory, but the actual top of the logical stack, equivalent to S in FIG. 1, would be A in a TOS register. In this example SR would contain the number 2, since only two TOS registers contain valid stack information. In order to determine which TOS registers have the valid stack information, and to determine the logical order of the TOS registers, a second set of reassignable names is given to the TOS registers.

The reassignable TOS register names are always associated with the TOS registers, unlike the A, B, C, D names, but they are not associated with just one register, as are TR0 through TR3. The NAMER register 28 determines the correspondence between the reassignable TOS register names and the TOS registers according to a scheme illustrated in the following state assignment table:

| NAMER | Reassignable TOS Register Names | | | |
|---|---|---|---|---|
| State | TR0 | TR1 | TR2 | TR3 |
| 00 | RA | RB | RC | RD |
| 01 | RD | RA | RB | RC |
| 10 | RC | RD | RA | RB |
| 11 | RB | RC | RD | RA |

TABLE 1

The NAMER states are expressed as binary numbers. As can be seen from the state assignment only a two bit NAMER register is necessary for four TOS registers. The name RA corresponds to the top piece of information in the TOS registers, RB to the next, etc. Now if SR = 1, then RA corresponds to A and B, C, and D are in memory 20. If SR = 2, RA corresponds to A and RB to B, with C and D in memory 20, and so forth. If SR = 4, then A, B, C, and D are all in TOS registers 22. Thus, the NAMER and SR registers are all that are necessary to tell the location and order of stack information in the TOS registers.

Figure 3:
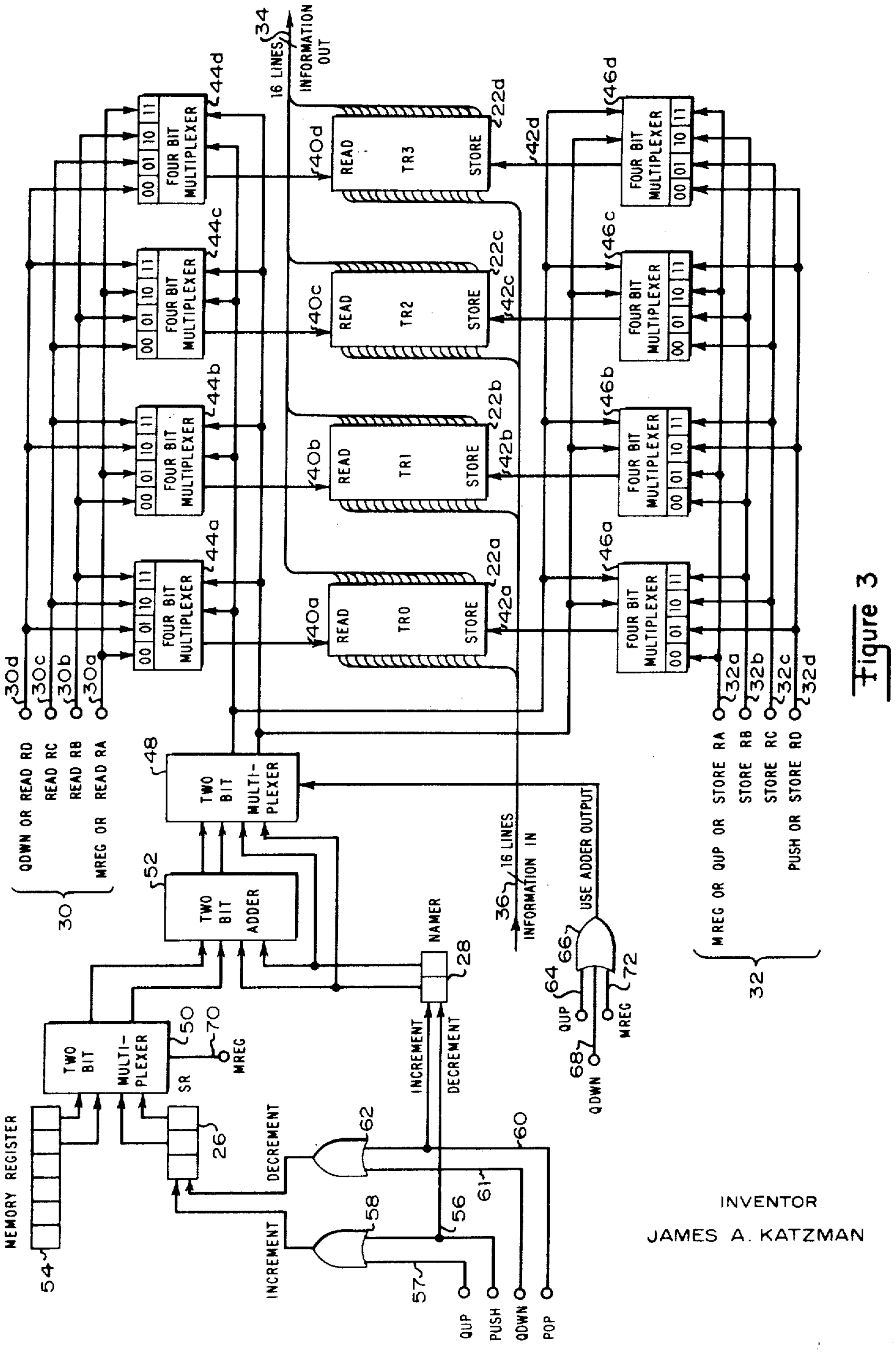
FIG. 3 is a block diagram of the preferred embodiment of the present invention.

A schematic block diagram of the Stack Register Renamer system is shown in FIG. 3. Each of the TOS registers **22*a* through 22*d* is illustrated as a sixteen bit parallel-input and -output register. The information inputs of the TOS registers are connected in parallel to form information input 36. Similarly, the information outputs are connected in parallel to form information output 34. Each TOS register also has a Read input 40 and a Store input 42. A logical control signal on the Read input causes a TOS register to place stored information on output 34. A logical control signal on the Store input causes a TOS register to store information present on input 36. Each of the Read and Store inputs is connected to one of a plurality of four bit multiplexers 44 and 46. The four bit multiplexers are in turn connected to the NAMER register 28 through a two bit multiplexer 48. The number stored in NAMER 28 determines which of the four multiplexer inputs connected to Read lines 30 or Store lines 32 is activated. For example, if the NAMER state is 01, then the 01 input on each of the four bit multiplexers will be enabled. If then a control signal is placed on Read RD line 30*d*, four bit multiplexer 44*a* will signal TOS register 22*a* and the contents of the TOS register will appear on information output 34**.

The SR register 26 is connected through a two-bit multiplexer 50 to a two bit adder 52. A memory register 54 is also connected to the two bit multiplexer 50. NAMER 28 is the second input to two bit adder 52, which in turn is connected to two bit multiplier 48. Both SR register 26 and NAMER register 28 are up-down counters; the operation of these registers is more fully described below in connection with the specialized stack operations PUSH, POP, QUP, QDWN and MREG.

The stack operation PUSH adds a piece of information to the top of the logical stack, as was discussed in connection with FIG. 1. A piece of information to be pushed onto the stack is usually held in a temporary memory, often known as a scratch pad memory (not shown), just before the operation. Three logical steps are required for the PUSH operation:

1. If the contents of the SR register equal four, dispatch the contents of RD to memory 20 at a location one above that stored in SM, increment SM and decrement SR; if the contents of SR are less than four, proceed to step 2;
2. Place new information in RD;
3. Decrement NAMER and increment Sr.

Figure 4:
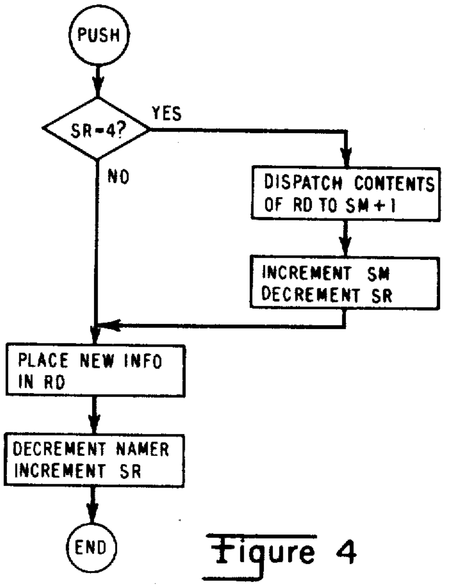
FIGS. 4–8 are flow charts for various stack operations.

These steps are illustrated in a flow chart in FIG. 4. The first step may be a microprogram performed in a computer central processing unit (CPU) (not illustrated) under the direction of a read only memory, for example, or it could be a hard-wired function. The purpose of the step is to make a TOS register available if all are full when the PUSH command is given. This step may be implemented, for example, by performing the test for SR = 4 in the CPU (a standard computer function), and then initiating the QDWN function described below if the TOS registers are full.

In the second step, the information to be pushed on the stack is placed on line 36 and a control signal is placed on line **32*d*, entering the information in the TOS register named RD. For the third step a control signal is placed on an input 56 of an OR gate 58 which simultaneously increments SR register 26 and decrements NAMER register 28**. Thus the SR register will show that one more TOS register is full and the NAMER register will "rotate" the names of the TOS registers so that RD becomes RA; RA, RB; etc.

The POP operation removes the top element on the stack, as discussed in connection with FIG. 1. There are two logical steps required for POP:

1. If the contents of SR equal zero, then decrement SM and stop; if the contents of SR do not equal zero, proceed to step 2;

2. Decrement SR and increment NAMER.

These steps are illustrated in the flow chart of FIG. 5. The test of the contents of SR may, as above, be performed by the computer CPU. The first part of step 1 is identical to a POP operation for a stack memory without any TOS registers. As with the first PUSH step, the first POP step could be performed by a microprogram or it could be a hard-wired function. In step 2, a control signal is placed on an input 60 of an OR gate 62 to decrement SR register 26*a* and increment NAMER register 28. As a result of step 2, one more TOS register will be designated as empty and the names of the registers will be moved up, i.e. RB will become RA; RC, RB; etc.

A third stack operation, called queue up (QUP), is used for moving information from memory 20 to the bottom of the TOS registers. There are five steps for the QUP operation:

1. Add the contents of the NAMER register to the contents of the SR register, modulo 4;

2. Use the resultant sum as a temporary naming state;

3. Transfer the contents of the memory location stored in SM to the register temporarily named RA;

4. Increment SR and decrement SM;

5. Return to the original naming state.

Figure 6:
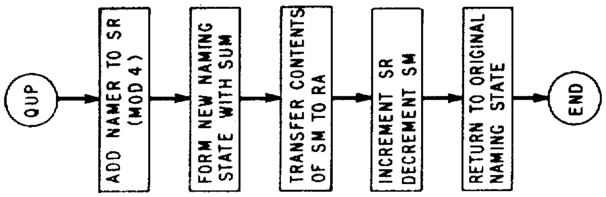

A flow chart of this operation is shown in FIG. 6. The sum called for by the first step is always present at the output of two bit adder 52. For the second step, a control signal is placed on an input 64 of an OR gate 66. The output signal from OR gate 66 causes two bit multiplexer 48 to connect the output of two bit adder 52 to the four bit multiplexers 44 and 46 to create the temporary naming state. The addition performed in step 1 is specified as modulo 4 because there are four naming states; thus, in general, the addition performed in this step will be modulo N where N is the number of naming states. For the third step, the information in memory 20 at the location stored in SM is transferred to information input 36 via a scratch pad memory, for example. Then a control signal is placed on store RA line 32*a* to store the information in the TOS register temporarily named RA.

In the fourth step, decrementing SM can be performed by a microprogram, as can the transfer from memory 20 in the previous step. SR register 26 is incremented by placing a control signal on input 57 of OR gate 58. For the fifth step, once the QUP control signal is removed from input 64, two bit multiplexer 48 again connects NAMER register 28 to four bit multiplexers 44 and 46. It should be noted that QUP is not a valid operation if SR is four, and the computer may disregard QUP or give an error signal in such a case.

The queue down (QDWN) operation is the complement of QUP, since it moves information from the bottom of the TOS registers to the location in memory 20 just above SM. The five steps for the QDWN operation are:

1. Add the contents of the NAMER register to the contents of the SR register modulo 4;

2. Use the resultant sum as a temporary naming state;

3. Transfer the contents of the register temporarily named RD to the memory location just above that stored in SM;

4. Decrement SR and increment SM;

5. Return to the original naming state.

Figure 7:
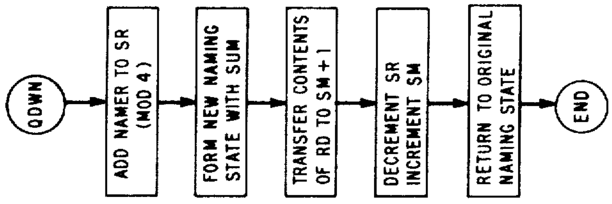

These steps are illustrated in a flow chart in FIG. 7. The first two steps are the same as for QUP. In the third step the contents of temporary RD are transferred to memory 20 at a location one higher than SM, via information output 34, in response to a control signal on Read RD line 30*d*. A scratch pad memory may be used as an intermediate step in the transfer. Then in the fourth step SM is incremented, by a microprogram for example, and SR is decremented by a control signal on input 61 of OR gate 62. The fifth step is accomplished, as in the fifth step of QUP, by the removal of the QDWN control signal from input 68 of OR gate 66. The QDWN operation is not valid if SR is zero.

The memory register correlation (MREG) operation allows a programmer to access information in the TOS registers by using addresses of the form used to access information in memory 20. Since all but the top four elements of the logical stack will always be in memory 20, most stack information can be accessed using absolute or relative memory addresses as well as implicitly referencing the top of the stack. For example, in FIG. 1 assume the address at DB is 100, at S, 206, and at Z, 300. Further assume in FIG. 2 that SR = 4 so the address at SM is 202. A programmer may specify the address of a piece of information in a number of different ways. As an example, the address of a piece of information at absolute address 200 might be expressed as 200, DB + 100 (a relative address), or S − 6 (a relative address) in FIG. 1, and as 200, DB + 100 or SM − 2 in FIG. 2. However, if in FIG. 2 SM is at 202, as was assumed above, the information at DB + 104 is no longer in memory 20, but in TOS register RC. The information at address 204 in memory 20 is considered garbage by the computer because it is not in the logical stack, and the computer will give an error signal if the programmer attempts to access information at absolute address 204. Therefore a function is necessary to allow a programmer to address information that may be in a TOS register.

The first operation necessary when a programmer attempts to access stack information by address is a determination of whether there is valid stack information at the address and whether the information is in memory 20 or a TOS register.

A microprogram, comprising the following steps, may be provided to perform this test:

1. Compute the difference (TA) between the absolute address (EA) of the location to be accessed and the address in SM (TA = EA − SM);

2. If TA is negative, the information is in memory 20; stop microprogram and enable access;

3. If TA is positive, compute the difference between SR and TA (SR − TA);

4. If (SR − TA) is negative, the region above S is being addressed, so issue error signal and stop program;

5. If (SR − TA) is positive, place result in memory register 54 and issue MREG instruction.

Figure 8:
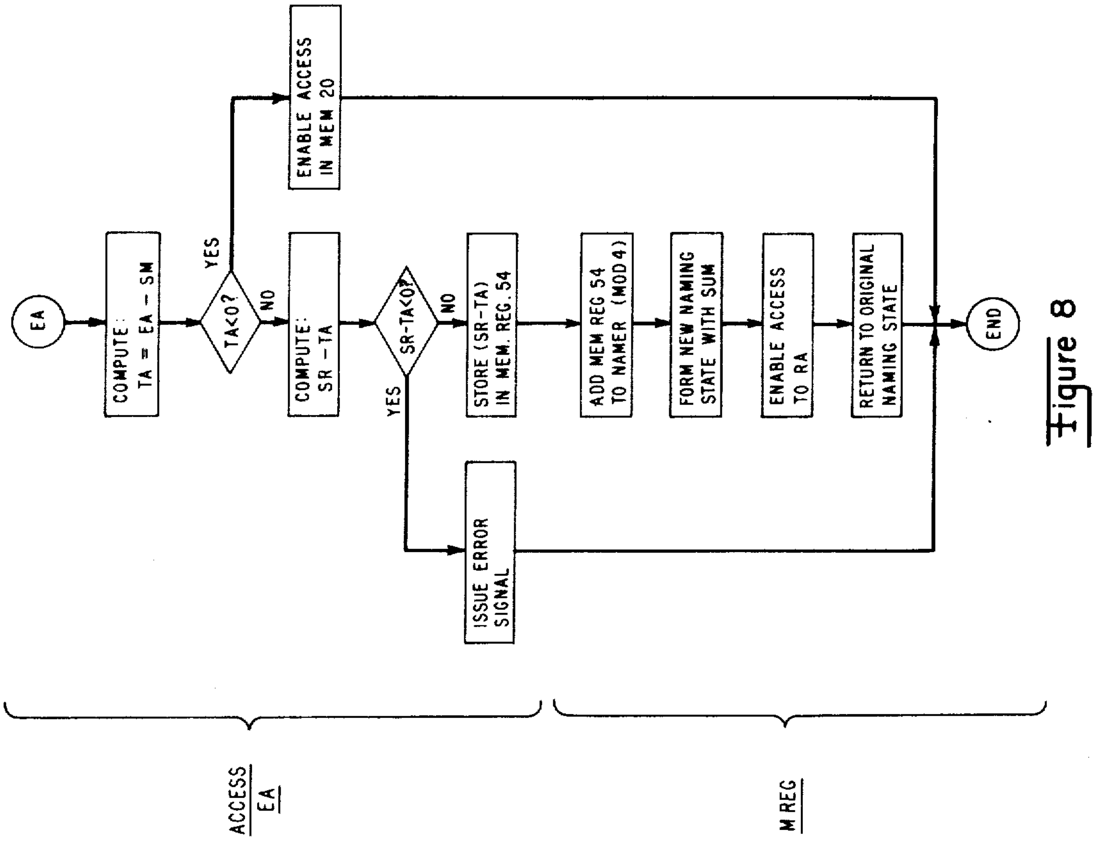

These steps are shown in flow chart form as a microprogram called ACCESS EA in FIG. 8. The purpose of the microprogram is to tell the memory system where the information to be accessed is located. In the example given above, TA would be 204 − 202 = +2, indicating the information is not in memory 20. Then (SR − TA) would be +4 −2 = +2, indicating the information is in a TOS register. The MREG operation then enables access to the appropriate TOS register by the following steps:

1. Add the contents of memory register 54 to the contents of the NAMER register, modulo 4;
2. Use the result from step 1 to form a temporary naming state;
3. Access information in the register temporarily named RA;
4. Return to original naming state.

A flow chart of the MREG steps is also shown in FIG. 8. When the MREG instruction is given, a control signal is placed on input 70 of two bit multiplexer 50 to connect memory register 54 to two bit adder 52. A control signal is also placed on an input 72 of OR gate 66 to connect the adder output to four bit multiplexers 44 and 46 to form the temporary naming state. If information is to be stored, it is placed on information input 36 and a control signal is placed on Store RA line 32a. If information is to be read, a control signal is placed on Read RA line 30*a* and the information will appear on information output 34. When the MREG signals are removed from inputs 70 and 72, the original naming state will be restored.

The stack memory system disclosed herein is not limited to the stack operations described above; they are offered as examples of the operation of the system. There are logical operations such as DUPLICATE and EXCHANGE that can also be performed within the TOS registers and which are facilitated by the present invention. The DUPLICATE operation places a new piece of information on the stack identical to the piece previously on top. EXCHANGE reverses the order of the information in the top N places of the stack. Also, while four TOS registers were illustrated, the invention is applicable to N TOS registers.

The specific state assignment shown supra in Table 1 is not unique. The requirements for the NAMER state assignments are that:

1. The reassignable register names always retain the same adjacent relationship.
2. Each change of one in the NAMER state shift the reassignable register names by an increment of one;
3. The logically last register is considered to be next to the logically first register for the purposes of naming.

From this definition it can be seen that the naming states or the labels in the state assignment table, Table 1, can be rotated, as in Table 2, without affecting the operation of the renaming scheme or the stack operations.

| NAMER State | Reassignable TOS Register Names TR0 | TR1 | TR2 | TR3 |
|---|---|---|---|---|
| 11 | RA | RB | RC | RD |
| 00 | RD | RA | RB | RC |
| 01 | RC | RD | RA | RB |
| 10 | RB | RC | RD | RA |

TABLE 2

Similarly, taking the mirror image of Table 1 as shown in Table 3 will not affect the renaming scheme or the stack operations herein disclosed.

| NAMER State | Reassignable TOS Register Names TR0 | TR1 | TR2 | TR3 |
|---|---|---|---|---|
| 00 | RD | RC | RB | RA |
| 01 | RC | RB | RA | RD |
| 10 | RB | RA | RD | RC |
| 11 | RA | RD | RC | RB |

TABLE 3

The naming states or the labels can be rotated in Table 3, as was illustrated for Table 1 in Table 2, without affecting the renaming scheme or stack operations.

However, if the matrix formed by the Reassignable TOS Register Names in Table 1 is replaced by its transpose (interchanging rows and columns), as shown in Table 4, some of the stack operations must be modified.

| NAMER State | Reassignable TOS Register Names TR0 | TR1 | TR2 | TR3 |
|---|---|---|---|---|
| 00 | RA | RD | RC | RB |
| 01 | RB | RA | RD | RC |
| 10 | RC | RB | RA | RD |
| 11 | RD | RC | RB | RA |

TABLE 4

For this state assignment the temporary naming state for QUP, QDWN, and MREG is formed by adding the complement of the naming state to SR and then taking the complement of that sum, instead of simply adding the contents of the two registers. To implement this scheme a more complex arithmetic function unit would be necessary in place of adder 52.

An alternative NAMER state assignment is illustrated in the following state assignment table:

| NAMER State | Reassignable TOS Register Names TR0 | TR1 | TR2 | TR3 |
|---|---|---|---|---|
| 1000 | RA | RB | RC | RD |
| 0100 | RD | RA | RB | RC |
| 0010 | RC | RD | RA | RB |
| 0001 | RB | RC | RD | RA |

TABLE 5

Figure 9:
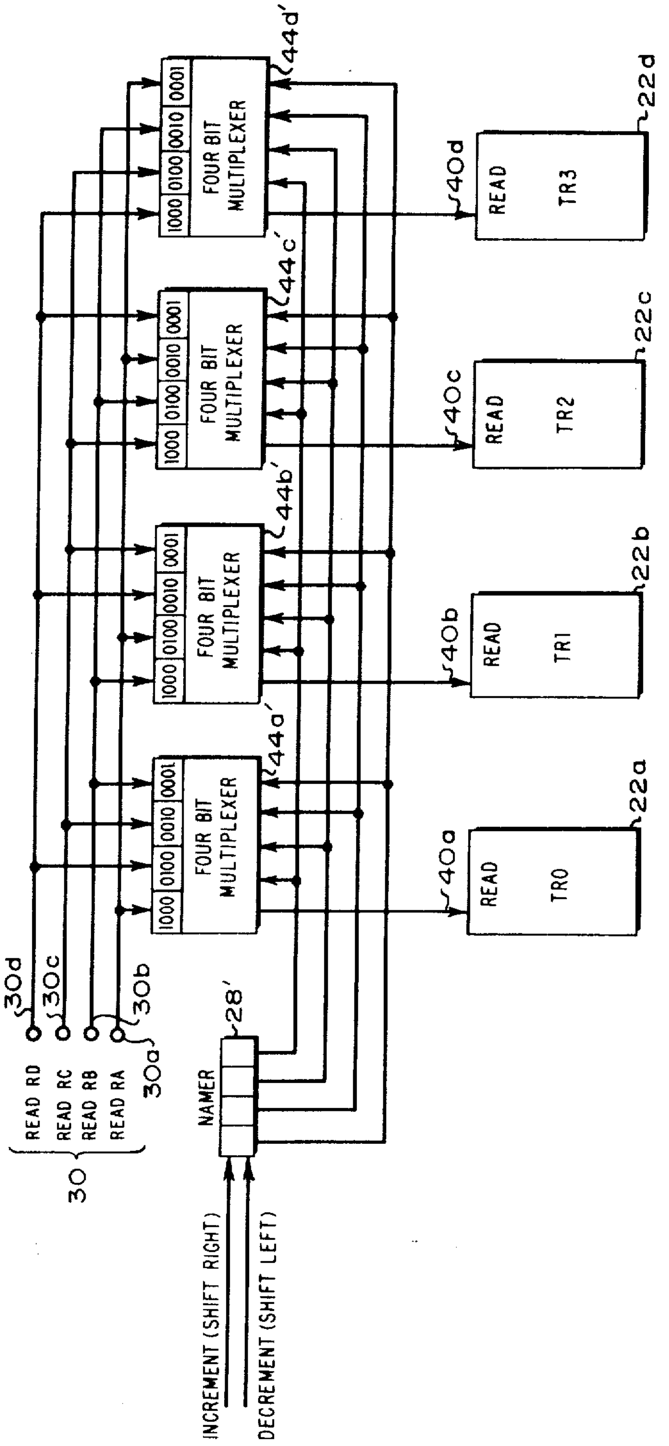
FIG. 9 is a block diagram of an alternative embodiment of a portion of the present invention.

FIG. 9 shows a simplified portion of FIG. 3 embodying the alternative namer scheme. The NAMER register 28′ is a four-bit shift register connected to four-bit multiplexers 44′. The four-bit multiplexers connect the appropriate Read inputs 30 with the corresponding TOS register in response to the contents of the NAMER register. Although only the Read input connections are shown, it will be understood that the Store input and other connections shown in FIG. 3 are made in a similar fashion. The position of the "1" bit in the NAMER register identifies the TOS register named RA. Instead of incrementing or decrementing a counter to change naming states, the "1" bit is shifted to the right or left, as indicated in FIG. 9. The PUSH and POP operations would be as described above, but QUP, QDWN, and MREG would require additional hardware such as a 1 out of 4 to binary decorder on the output of NAMER 28′.

I claim:

1. A stack memory system for storing a logical stack of information comprising:
   - a plurality of stack registers for storing logical stack information, each stack register having an information input and output;
   - a first data register for storing a number representative of the number of stack registers that contain logical stack information;
   - a second data register for storing a naming state number representing the logical order of the information stored in the stack registers, the number of naming states being equal to the number of stack registers;

first logic means having a plurality of ordered access input means, the first logic means being connected to the second data register and to each stack register for connecting an ordered access input means to each of the stack registers in response to the naming state number stored in the second data register for enabling stack register access via said information input and output in response to control signals on the ordered access input means, a different ordered access input means being connected to a given stack register for each of said naming state numbers and a change of one in said naming state number effecting the connection of the adjacent ordered access input means to a given stack register, the relative order between stack registers being preserved; and second logic means connected to the first and second data registers for stepping the first and second data registers in response to the addition and removal of information from the stack registers.

2. A stack memory system as in claim 1 wherein:

each stack register has a store input for causing the stack register to store information present on the information input and a read input for causing information stored in the stack register to appear on the information output;

the first logic means includes a read logic means for enabling the stack registers to output information on the information output and a store logic means for enabling the stack registers to store information present on the information input;

a portion of the ordered access input means is ordered read inputs connected to the read logic means;

another portion of the ordered access input means is ordered store inputs connected to the store logic means;

the read logic means connect the ordered read inputs to the stack register read inputs in response to the naming state number stored in the second data register; and the store logic means connect the ordered store inputs to the stack register store inputs in response to the naming state number stored in the second data register.

3. A stack memory system as in claim 2 wherein:

the number of ordered read inputs and of ordered store inputs is equal to the number of stack registers, N; and the read logic means and the store logic means each include an N bit multiplexer for each stack register.

4. A stack memory system as in claim 3 including third logic means for adding information to the top of the logical stack of information in response to a first external signal and for removing information from the top of said stack in response to a second external signal, the third logic means being connected to the first and second data registers, and to the last of the ordered store inputs, the first external signal causing the third logic means to:

place a control signal on the last ordered store input to cause information to be stored in the stack register connected to that last ordered store input; decoder step the first data register to indicate an increase in the number of stack registers containing stack information; and step the second data register to change the connection of the stack register just accessed from the last to the first ordered store input; and the second external signal causing the third logic means to:

step the first data register to indicate a decrease in the number of stack registers containing stack information; and step the second data register to connect the last ordered store and read inputs to the stack register previously connected to the first ordered store and read inputs.

5. A stack memory system as in claim 1 including:

a read-write memory having a plurality of addressable locations for storing at least a portion of the logical stack of information;

a third data register for storing the address of the top piece of information in the stack contained in the read-write memory;

fourth logic means connected to the stack registers, to the first, second, and third data registers, and to the first and second logic means for transferring logical stack information from the read-write memory to a stack register in response to a first external signal and for transferring logical stack information from a stack register to the read-write memory in response to a second external signal.

6. A stack memory system as in claim 5 wherein:

each stack register has a store input for causing the stack register to store information present on the information input and a read input for causing information stored in the stack register to appear on the information output;

the first logic means includes a read logic means for enabling the stack registers to output information on the information output and a store logic means for enabling the stack registers to store information present on the information input;

a portion of the ordered access input means is ordered read inputs connected to the read logic means;

another portion of the ordered access input means is ordered store inputs connected to the store logic means;

the read logic means connect the ordered read inputs to the stack register read inputs in response to the naming state number stored in the second data register; and the store logic means connect the ordered store inputs to the stack register store inputs in response to the naming state number stored in the second data register.

7. A stack memory system as in claim 6 wherein:

the number of ordered read inputs and of ordered store inputs is equal to the number of stack registers, N; and the read logic means and the store logic means each include an N bit multiplexer for each stack register.

8. A stack memory system as in claim 7 including third logic means for adding information to the top of the logical stack of information in response to a first external signal and for removing information from the top of said stack in response to a second external signal, the third logic means being connected to the first and second data registers, to the information input and output and to the last of the ordered store inputs, the first external signal causing the third logic means to:

place a control signal on the last ordered store input to cause information to be stored in the stack register connected to that last ordered store input;

step the first data register to indicate an increase in the number of stack registers containing stack information; and step the second data register to change the connection of the stack register just accessed from the last to the first ordered store input; and the second external signal causing the third logic means to:

step the first data register to indicate a decrease in the number of stack registers containing stack information; and step the second data register to connect the last ordered store and read inputs to the stack register previously connected to the first ordered store and read inputs.

9. A stack memory system as in claim 8 wherein the fourth logic means includes:

an adder having inputs connected to the first and second data registers and having an output;

a multiplexer having inputs connected to the output of the adder, and to the second data register, and having an output connected to the read logic means and store logic means;

a logic element connected to the multiplexer for signalling the multiplexer to connect the adder to the read logic means and the store logic means for establishing a temporary naming state number in response to the first or second external signal whereby in response to the first external signal the top piece of information in the read-write memory is transferred to the stack register connected to the first ordered store input, the first data register is stepped to indicate an increase in the number of stack registers containing stack information, and the third data register is stepped to indicate the removal of a piece of information from the top of the stack of information in the read-write memory; and in response to the second external signal the information in the stack register connected to the last ordered read input is transferred to the location in the read-write memory immediately above the top piece of information in the logical stack therein, the first data register is stepped to indicate a decrease in the number of stack registers containing stack information, and the third data register is stepped to indicate the addition of a piece of information to the top of the stack in the read-write memory.

10. A stack memory system as in claim 9 including a fourth data register for storing a computed number; and adder means having inputs connected to the second and fourth data registers for adding said computed number to the number in the second data register and having an output connected to the read logic means and the store logic means in response to an external signal.

* * * * *